July 11, 1972   A. J. MATULIS   3,676,274
DISTORTION-FREE MIRROR ATTACHED TO A METALLIC HOLDER
Original Filed Oct. 2, 1967

INVENTOR.
ALBERT J. MATULIS

United States Patent Office 3,676,274
Patented July 11, 1972

3,676,274
DISTORTION-FREE MIRROR ATTACHED TO A METALLIC HOLDER
Albert J. Matulis, Philadelphia, Pa., assignor to the United States of America as represented by the Secretary of the Army
Original application Oct. 2, 1967, Ser. No. 672,386. Divided and this application May 29, 1970, Ser. No. 38,872
Int. Cl. B44f 1/00; G02b 5/08
U.S. Cl. 161—4      1 Claim

ABSTRACT OF THE DISCLOSURE

A method for securing a mirror to its metal holder by the use of an adhesive containing a plurality of shims imbedded therein so that there are only point contacts between the mirror and said metal holder and the resolution of the mirror is practically unaffected by distortion of the metal holder.

The invention described herein may be manufactured, used and licensed by or for the Government for governmental purposes without the payment to me of any royalty thereon.

---

This is a division of application Ser. No. 672,386, filed Oct. 2, 1967, now abandoned.

This invention relates to an adhesive composition and more particularly to an adhesive composition for bonding mirrors or other such items, where the adhesive contains a plurality of shims imbedded therein.

In the past, the use of mirrors in delicate mechanisms such as periscopes and scientific equipment, required that the image producing mirror be secured in such a way as to be distortion free. This was easily possible, by the use of known conventional means, when the mirror was used in moderate climate environment. The problem arose, upon a drastic change of temperature, either excessively hot or excessively cold. This aforementioned change of temperature distorted the image of the mirror by distorting the underlying metal.

It is therefore an object of the present invention to provide a composition for bonding mirrors to a metal holder wherein there is no change in resolution concurrent with distortion due to environmental climate change.

The above object as well as others together with the benefits and advantages of the invention will be apparent upon reference to the detailed description set forth below, particularly when taken in conjunction with the drawings annexed hereto in which.

Figure 1:
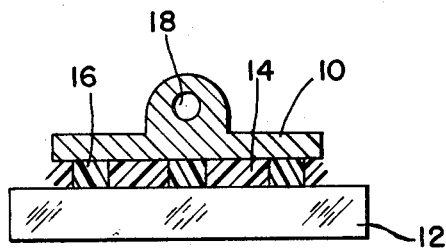
FIG. 1 illustrates a side sectional view of the invention before distortion.

Referring first to FIG. 1, there is shown a metallic mirror holder 10 having secured thereto a low resolution mirror 12 utilizing a composition consisting of a 1-1 ratio of adhesive and accelerator. The accelerator being a suspension of lead dioxide ($PbO_2$) in di-butyl phthalate, and the adhesive being polysulfide. Imbedded in said bonding material 14, between said metal holder 10 and said mirror 12, are a plurality of plastic shims 16. Adapting means 18 of the metal holder 10 is used to secure the holder in position in the apparatus to which the mirror is to be used.

Figure 2:
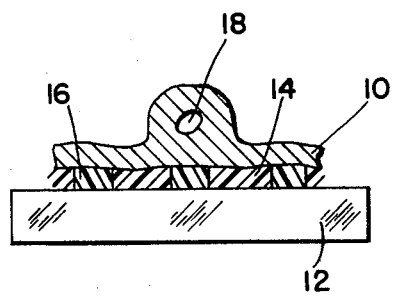
FIG. 2 illustrates a side sectional view of the invention after distortion.

The view as seen in FIG. 1 illustrates a mirror attached to the metallic holder in a normal moderate climate environment. The view as seen in FIG. 2 illustrates what happened when the combination of mirror and metallic holder are placed in an environment of excessive climate such as very hot or very cold. As can be seen in FIG. 2 the metal of the metallic holder 12 becomes distorted and yet the mirror still retains its perfect resolution. If the mirror had been secured directly to the metal holder without the use of the shim 16 there would be a large contact area whereby the expansion and/or contraction of the metal would adversely affect the resolution of the mirror. The use of the plurality of shims 16 imbedded in the adhesive provides only point contact between the metal holder 10 and the mirror 12 and the resolution of the mirror is practically unaffected by distortion of the underlying metal..

Using the above described composition it is possible to mount or bond a low reolution mirror of, for example, 1.3 seconds to a metal holder so that upon a change in temperature there will be no distortion of the mirror. Tests have been conducted which illustrate that after testing at temperatures of 150° F. and 65° below zero F. the mirror still retained a 1.3 second resolution.

A secondary advantage of the use of said inventive composition would be ease of separating the mirror from the metallic holder without destruction of either by merely cutting along the center of the plastic shims without having to destroy either the mirror or the holder.

I wish it to be understood that I do not desire to be limited to the exact details of construction shown and described, for obvious modifications will occur to a person skilled in the art.

I claim:
1. A distortion-free mirror structure, comprising
   a metallic mirror holder,
   a bonding material secured to said metallic holder, said bonding material consisting of a 1-1 ratio of polysulfide adhesive and an accelertaor, said accelerator being a suspension of lead dioxide in di-butyl phthalate,
   a plurality of laterally spaced plastic shims embedded in said bonding material, and
   a mirror bonded to said metallic mirror holder by said bonding material and having a point-contact with said metallic holder through said shims.

References Cited

UNITED STATES PATENTS

| | | | |
|---|---|---|---|
| 2,294,940 | 9/1942 | Skolnik | 350—310 XR |
| 2,000,303 | 5/1935 | Tauchmann | 350—310 XR |
| 2,893,906 | 7/1959 | Taylor | 161—187 XR |
| 3,075,871 | 1/1963 | Barlet | 161—187 XR |

FOREIGN PATENTS

| | | | |
|---|---|---|---|
| 460,139 | 1/1937 | Great Britain | 161—187 |

PHILIP DIER, Primary Examiner

U.S. Cl. X.R.

156—327; 161—187, 196, 410; 350—310